April 30, 1974
R. C. WILSON, JR
3,808,121
METHOD OF REGENERATING A HYDROCARBON CONVERSION CATALYST TO MINIMIZE CARBON MONOXIDE IN REGENERATOR EFFLUENT
Filed Nov. 1, 1972

United States Patent Office 3,808,121
Patented Apr. 30, 1974

3,808,121
METHOD OF REGENERATING A HYDROCARBON CONVERSION CATALYST TO MINIMIZE CARBON MONOXIDE IN REGENERATOR EFFLUENT
Robert C. Wilson, Jr., Woodbury, N.J., assignor to Mobil Oil Corporation
Filed Nov. 1, 1972, Ser. No. 302,984
Int. Cl. B01j 11/68; C10g 11/18
U.S. Cl. 208—113
9 Claims

ABSTRACT OF THE DISCLOSURE

Describes the regeneration of a hydrocarbon conversion catalyst in the presence of a carbon monoxide oxidation catalyst of larger particle size retained in the regeneration zone.

BACKGROUND OF THE INVENTION

Figure 1:
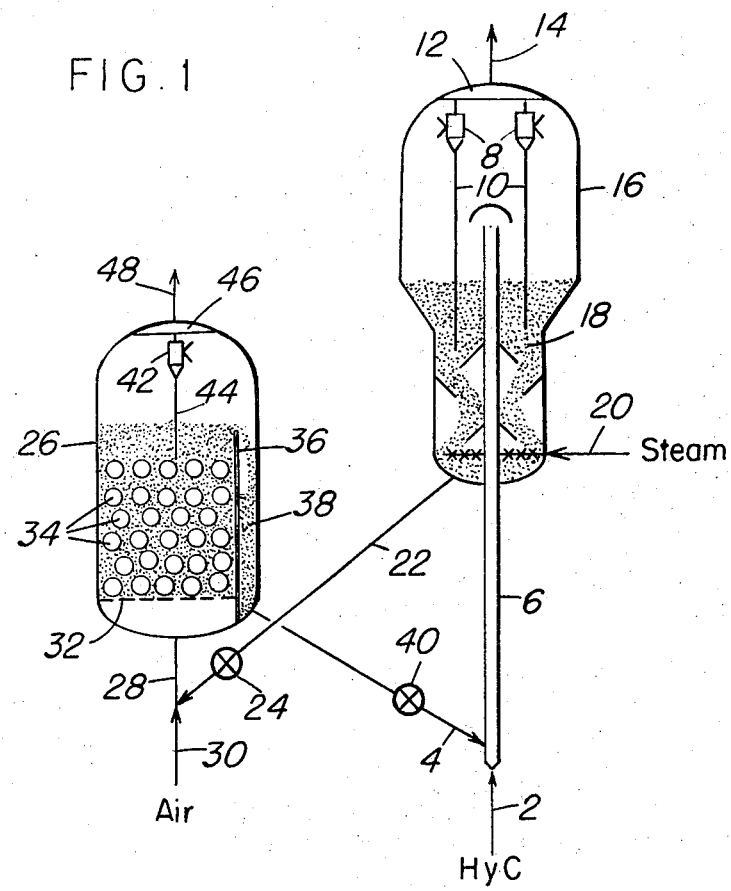

The present invention relates to the catalyst conversion of hydrocarbons during which conversion step carbonaceous deposits accumulate on the catalyst particles. The catalyst particles with carbonaceous deposits are then passed to a regeneration zone wherein the carbonaceous deposits are removed by burning in an oxygen containing atmosphere. During this burning step known as catalyst regeneration one frequently encounters a phenomenon known as afterburning contributed substantially by the conversion of carbon monoxide to carbon dioxide. It has been observed that when afterburning occurs that catalyst particles present are exposed to extremely high temperatures of the order of about 2000° F. However, it has also been observed that some cracking catalyst at temperatures in excess of 1400° F. lose their activity significantly, thus destroying the efficiency of the catalyst. On the other hand, it is known from the prior art that modern day cracking catalysts comprising crystalline aluminosilicate are much more temperature stable than earlier known amorphous cracking catalyst and thus higher regeneration temperature may be used thereby contributing significantly to the overall heat balance of the operation.

SUMMARY OF THE INVENTION

This invention is concerned with a method and process for effecting the catalytic conversion of hydrocarbon and the regeneration of catalyst employed therein. In one aspect the present invention is concerned with improving the regeneration operation of the combination process without undesirably influencing the catalytic conversion step. More particularly the present invention is concerned with improving the conversion of carbon monoxide produced in a catalyst regeneration zone to carbon dioxide and recovering the resultant heat of reaction by the catalyst passed through the regeneration system.

The present invention relates to improving the benefits of separate catalytic reactions carried out in the presence of each other or in close proximity to each other within a common reaction zone. Each of the intended reactions contemplated are exothermic reactions and thus it is important to convert and maintain the reaction temperatures within predetermined relatively narrow limits. It is also important to disperse the generated exothermic heat to a suitable heat sink so that it may be rapidly and efficiently removed from the exothermic reaction zone for use in a downstream endothermic conversion zone. In the combination of this invention solid particle form material comprising a cracking catalyst is subjected to exothermic reaction conditions in the presence of solids of larger particle size retained within the exothermic reaction zone in a manner which will facilitaate and enhance transfer of generated heat to the solid particle cracking catalyst in a rapid and an efficient manner. Thus the solid particle cracking catalyst is relied upon as a heat sink for conveying generated heat from the exothermic reaction zone to an endothermic reaction zone. In a particular application the exothermic reaction zone is a catalyst regeneration zone and the endothermic reaction zone is a hydrocarbon conversion zone. The endothermic reaction zone may be in fluid catalyst or a moving bed cracking zone involving the production of gasoline and other desired products. In the endothermic cracking operation the solid catalytic particles become coated with carbonaceous material which is thereafter removed by burning in a regeneration zone by contact with an oxygen containing gaseous material such as air. The cracking zone may be one of riser cracking, dense fluid bed cracking, downwardly moving bed cracking or a combination thereof as required to obtain a desired conversion of different hydrocarbon feed materials passed thereto. The catalyst regeneration zone on the other hand may be one of riser regeneration relying upon a plurality of riser regenerators sequentially or parallel connected, a dense fluid bed regeneration system, a downwardly moving bed catalyst regeneration system or one or more combinations of the above identified systems. Preferred arrangements are more fully discussed herein.

In particular, the present invention relates to taking advantage of carbon monoxide conversion, more often identified with the phenomenon of afterburning, in such a manner as to transfer the heat of this reaction within a region of the catalyst coke burning step so that the recovery of such heat of reaction by the catalyst is substantially enhanced thereby improving upon the overall heat balance of the operation.

The employment of two separate particles of catalysts of different composition in a common reaction zone is accomplished in a particular embodiment by confiining the larger sized particle of said catalytic compositions as a mass of catalyst particles within the reaction zone and passing a suspension of the other catalyst composition of a smaller particle size in a suitable fluidizing medium such as oxygen-containing regeneration gas through the confined mass of catalyst so that the suspended catalyst is removed at an elevated temperature suspended by the gaseous products of the catalyst is separately removed from gaseous products from an upper portion of the regeneration zone.

The confined mass of relatively larger catalyst particles may be substantially fixedly positioned within the exothermic reaction zone in much the same manner as a packed tower filled with Raschig rings or other suitable contact devices or the confined large size particles may be sized to permit limited random movement within a restricted portion of the reaction zone by the upflowing suspension of gaseous material and finely divided particle material.

The finely divided catalyst particles passed or circulated through the system of catalytic regeneration and hydrocarbon conversion may be substantially any cracking catalyst whether amorphous or crystalline in nature or a mixture thereof. The invention is concerned in a particular aspect with improving upon the recovery of heat produced and available from the regeneration zone without impeding the function of the cracking catalyst in the cracking zone.

The present invention relates in a more particular aspect to maintaining a mass of relatively large size particles comprising a carbon monoxide oxidation catalyst within a regeneration zone and causing smaller particles of a cracking catalyst to pass through the voids therebetween in an upward or downward direction during removal of carbonaceous deposits therefrom by burning in an oxygen-containing atmosphere. Thus it is contemplated employing in a particular embodiment contact zones such as packed towers or suitably sized chambers provided with either relatively larger spherical particles, monoliths, Berl saddles or Raschig rings impregnated with a carbon monoxide oxidation catalyst and causing cracking catalyst particles during regeneration to move through the voids or spaces thus provided by such larger objects in the regeneration zone. Of course it is to be understood that there may be more than one regeneration zone in parallel of sequential arrangement with one another providing the space (volume) required to effect regeneration of the catalyst particles.

In present day fluid cracking operations employing high activity and selective crystalline aluminosilicate cracking catalysts, a significant reduction in carbonaceous deposits has been achieved by virtue of the catalyst composition employed, the use of high temperature operating conditions, and also the use of short contact time between the hydrocarbon being converted and the catalyst particles. This achievement in reducing significantly the amount of carbonaceous material such as coke deposited on the catalyst in favor of more desirable liquid and vaporous products thus detracts from the heat which may be developed by burning of coke for the endothermic cracking operation. Thus, maintaining a heat balanced operation becomes even more critical and every means to improve upon the heat balance of the operation without impeding the function of the cracking catalyst is continually being sought.

It has been suggested in the prior art that the presence of a carbon monoxide oxidation catalyst in the endothermic cracking zone tends to increase the amount of coke formed therein thereby reducing the yield of desired products and compounding the problem of coke removal along with losses in cracking catalyst selectivity. The present invention is concerned with eliminating or at least substantially reducing these operational inefficiencies suggested by the prior art.

The prior art suggests using a crystalline aluminosilicate cracking catalyst having a restricted pore size which restricts the size of a vaporous component or compound that can enter the catalyst pore and contact a carbon monoxide oxidation catalyst such as chromium oxide located therein. Thus it is suggested to employ a shape selective aluminosilicate wherein only carbon monoxide, carbon dioxide and oxygen will be selectively admitted to the internal pore structure thereof.

The present invention on the other hand departs from the prior art in that it does not impose a pore size restriction upon the crystalline aluminosilicate cracking component and eliminates the CO oxidation catalyst from the cracking or hydrocarbon conversion zone since the carbon monoxide oxidation catalyst is associated with the cracking catalyst only during regeneration of the cracking catalyst. Therefore the cracking system of this invention may be as selective as the operating conditions and crystalline aluminosilicate cracking component will permit and the regeneration system is significantly independently enhanced by the recovery of heat generated therein.

It has been found that the selectivity of cracking catalysts can be significantly improved by judicious selection of reaction temperatures, contact time, catalyst/oil ratios and the hydrocarbon charge material passed to the cracking zone regardless of catalyst composition; that is, whether the catalyst is entirely amorphous, crystalline or mixed amorphous crystalline cracking components. However, it has also been found that under some operating conditions the deposited carbonaceous material available for burning in the regeneration is of a relatively low order of magnitude and this interferes considerably with providing a heat balanced operation. On the other hand, it is known that the efficiency of a catalyst regeneration operation is significantly disturbed when afterburning of any significant magnitude is permitted or encountered since such afterburning generated heat is usually not transferred or is improperly transferred to the catalyst thus heat damaging a small portion of the catalyst before its return to the cracking step. Catalyst particles encountering afterburning heat in, for example, a dispersed catalyst phase or in the regenerator cyclone separators often become deactivated by the high afterburning temperature encountered. It is known that after burning is caused by the exothermic reaction of carbon monoxide conversion to carbon dioxide. The present invention safely implements the transfer of carbon monoxide conversion generated exothermic heat to the catalyst particles under conditions controlled to provide a more uniform heat distribution without impairing the catalyst activity and selectivity.

One way to facilitate passage of finely divided cracking catalyst component through the voids of a mass of larger solid particles maintained in a regeneration zone is accomplished by using a carbon monoxide oxidation catalyst particle of about ¼ inch or larger in diameter. The carbon monoxide oxidation component may be selected from one or more of the oxides of copper, chromium, nickel, manganese and copper chromite. The oxidation catalyst may be in tablet form or any one of the forms above identified preferably supported in a matrix material which is relatively inert, hard and porous such as alumina spheres and monoliths, i.e., corrugated ceramic supports. The mass of carbon monoxide oxidation catalyst particles may be retained in the regeneration zone substantially as a fixed bed of larger particle materials provided with void space therebetween. On the other hand, it is contemplated employing spherical objects which will tend to float or provide restricted and limited random motion in the regenerator during passage of fluidizable catalyst particles in regeneration gas upwardly therethrough.

The heart of the present invention thus involves utilizing a catalyst system comprising two separate components, one being suitable for effecting a highly sophisticated and selective hydrocarbon conversion with the other being suitable for considerably enhancing the conversion of available carbon monoxide in a regenerator under conditions which will increase the heat absorbed by cracking catalyst particles in the presence thereof for transfer to a catalytic endothermic hydrocarbon conversion zone.

To particularly accomplish the essence of this invention, applicant restricts the carbon monoxide oxidation catalyst to the catalyst regeneration zone so that carbon monoxide formed and conversion is in such close proximity to the cracking catalyst during regeneration thereof that the oxidation of coke will proceed rapidly to essentially carbon dioxide without encountering uncontrolled high exothermic temperature contributing to deactivation of the cracking catalyst component. Thus the passage of the cracking catalyst during regeneration in a tortuous confined manner upwardly through a multiplicity of confined passageways in a mass of carbon monoxide oxidation catalyst not only promotes the conversion of carbon monoxide to carbon dioxide substantially as formed but the proximity of the particles of catalyst thereto acts to more uniformly disperse heat generated in the operation to that of the fluid particle material subsequently passed to the cracking operation.

In the method and processing combination of this invention it is contemplated operating the cracking operation or hydrocarbon conversion step at a temperature selected from within the range of from about 800° F. up to about 1200° F. and more usually at conversion temperatures of at least 1000° F., and a hydrocarbon residence time in contact with catalyst particles in the reaction zone selected from within the range of 1 to 50 seconds and preferably from about 4 to about 10 seconds. Pressure equal to or above atmospheric pressure may be employed and a catalyst to oil ratio selected from within the range of 3 to about 20. The regeneration step of the process on the other hand is preferably maintained at a temperature less than about 1600° F. and more usually within the range of 1100 to about 1400° F. depending upon the catalyst employed. Pressures within the range of from about atmospheric up to several atmospheric pressures may be employed in the regeneration operations.

Crystalline aluminosilicate cracking catalyst which may be employed in the catalyst system of this invention includes substantially any active crystalline component having a pore size in excess of 6 angstorms and particularly in excess of about 9 angstroms, it being preferred to employ a crystalline aluminosilicate component providing little if any significant restriction with respect to catalyst pore size and the hydrocarbon composition converted in the presence thereof. The crystalline aluminosilicate may be combined with an amorphous support material as taught in the prior art of U.S. Pat. 3,140,249.

BRIEF DISCUSSION OF THE FIGURES

FIG. 1 diagrammatically represents in elevation an arrangement of apparatus and system for effecting the conversion of hydrocarbons, stripping of catalyst regeneration of catalyst and return of regenerated catalyst to the conversion zone.

Figure 2:
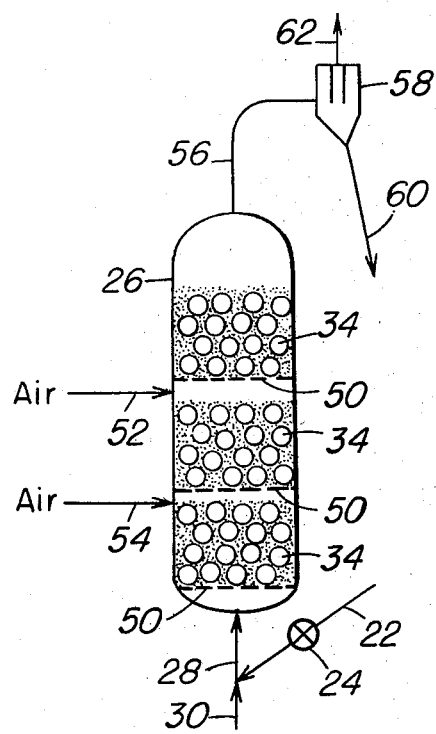

FIG. 2 diagrammatically represents in elevation a regeneration arrangement which may be substituted for the regenerator of FIG. 1.

DISCUSSION OF SPECIFIC EMBODIMENTS

Referring now to FIG. 1, there is shown an arrangement of apparatus comprising a system for effecting the conversion of hydrocarbons in the presence of catalyst particles and regeneration of the catalyst used therein. In the arrangement of FIG. 1, a hydrocarbon feed 2 is combined with regenerated catalyst in conduit 4 to form a suspension at a cracking temperature of at least about 950° F. The suspension is thereafter passed upwardly through riser 6 for a duration of time sufficient to effect conversion of the hydrocarbon charge to desired products including gasoline and lower boiling hydrocarbon constituents thereby depositing carbonaceous materials upon the catalyst particles during the catalytic reaction. The suspension is discharged from the upper end of riser 6 and is caused to separate into essentially a vaporous hydrocarbon phase and a catalyst phase. The vaporous hydrocarbon phase containing some entrained catalyst fines enters cyclone separator 8 wherein a further separation of catalyst from hydrocarbon vapors is effected. In separator 8 the catalyst is accumulated in the bottom of the separator and withdrawn by diplegs 10. Hydrocarbon vapors pass overhead to plenum chamber 12 for withdrawal by conduit 14 and eventual passage to a fractionation tower not shown. The catalyst particles separated from the riser and cyclone separators are collected and form a relatively dense fluid bed of catalyst 18 in the lower portion of separation vessel 16. The dense fluid bed of catalyst particles moves generally downwardly through the lower portion of the vessel arranged as a stripping chamber or section supplied by upflowing stripping gas such as steam by conduit 20. The stripping chamber may be provided with a plurality of staggered baffle members or other suitable means to provide a tortuous path for the catalyst being stripped. Stripped catalyst is withdrawn from the stripping zone by conduit 22 containing valve 24 for passage into a regeneration chamber 26 as by conduit 28. The regeneration air in conduit 30 is mixed with stripped catalyst and passed upwardly through conduit 28 into the bottom portion of a regeneration zone more fully discussed hereinafter. Regeneration zone 26 is provided with a horizontal grid means 32 across the lower cross section thereof upon which rests relatively large spherical members providing void space therebetween through which upflowing catalyst particles and regeneration gas such as air will pass into an upper portion of the regeneration vessel. The spherical members 34 are impregnated with a carbon monoxide oxidation catalyst as described hereinbefore. During passage of the catalyst and air mixture from conduit 28 into the lower portion of the regenerator 26 it passes upwardly through distributor grid 32 and thence moves upwardly through the voids provided by the spherical members. The catalyst in a regenerated condition then overflows a vertical baffle 36 and is caused to be collected in a space 38 as a mass of catalyst suitable for return to the hydrocarbon conversion zone by conduit 4 containing control valve 40. Regeneration flue gases move through suitable cyclone separators represented by separator 42 provided with dipleg 44 for returning catalyst particles separated from the flue gas to the dense bed of the catalyst therebelow. Flue gases of the regeneration stage pass into a plenum chamber 46 and are removed therefrom by conduit 48. During passage of the catalyst-air suspension upwardly through the void provided by the spherical members the catalyst becomes regenerated by the burning of carbonaceous material deposited thereon thereby heating the catalyst to an elevated temperature. In addition, carbon monoxide formed during this burning step is converted to carbon dioxide by the oxidation catalyst impregnated spherical members. It is contemplated adding additional regeneration air to the mass of catalyst and spherical members in the regenerator in a down-stream portion of the upflowing catalyst to facilitate the conversion of carbon monoxide to carbon dioxide so that the exothermic heat thereof may be transferred to the upwardly flowing catalyst particle.

FIG. 2 departs from FIG. 1 primarily in the arrangement of the regeneration system. In the arrangement of FIG. 2 the regeneration vessel 26 is provided with a plurality of spaced apart horizontal dispersed grid means 50 upon which rests spherical particles 34 comprising a carbon monoxide oxidation catalyst. Conduits 52 and 54 are provided for adding additional air beneath the grid means 50 provided in the regeneration vessel. In this arrangement spent stripped catalyst recovered from a stripping zone such as shown in FIG. 1 as by conduit 22 containing flow control valve 24 is combined with regeneration air introduced by conduit 30 and passed into the lower portion of the regeneration zone by conduit 28, similar to that discussed with respect to FIG. 1. In this arrangement the catalyst undergoing regeneration is caused to pass upwardly through a plurality of sequentially arranged catalyst regeneration zones and through the voids provided by spherical means spaced between grids and comprising a carbon monoxide oxidation catalyst. The regeneration of the catalyst and conversion of carbon monoxide to carbon dioxide is considerably enhanced by the arrangement of FIG. 2, thus providing a regenerated catalyst at an elevated temperature which is withdrawn from the upper portion of the regeneration zone as by conduit 56 for transfer to one or more cyclone separators represented by cyclone separator 58. Catalyst separated as by cyclone separator 58 is collected in a lower portion thereof and thereafter passed by conduit 60 to, for example, riser 6, as discussed with respect to FIG. 1. Regeneration flue gases are removed from cyclone separator 58 by conduit 62. It is to be understood that the diagrammatic regenerator system of FIG. 2 may be separated into two or more vessels in sequential arrangement with one another rather than providing a single vessel with separated zones as shown and discussed with respect to FIG. 2. It is also to be understood that the method of the present invention is applicable to a downwardly moving catalyst bed system or operation as distinguished from an upwardly flowing fluid catalyst operation through which a catalyst suspension is passed.

Having thus provided a general discussion of the improvements and concepts going to the very essence of the present invention and described specific embodiments pertaining thereto it is to be understood that no undue restrictions are to be imposed by reason thereof except as defined by the following claims.

I claim:
1. In a process for the continuous catalytic conversion of hydrocarbon materials accompanied by the deposition of carbonaceous material upon the catalyst and wherein the deposited carbonaceous material is removed from the catalyst by burning in a catalyst regeneration zone the improvement which comprises passing catalyst containing carbonaceous deposits of hydrocarbon conversion with regeneration gas through a regeneration zone containing a retained mass of separate discrete solids comprising a carbon monoxide oxidation catalyst.

providing oxygen containing regeneration gas in said regeneration zone in an amount to effect conversion of carbon monoxide to carbon dioxide during removal of carbonaceous deposits by burning, and removing catalyst particles from which deposited carbonaceous material has been removed at an elevated temperature from said regeneration zone for return to said hydrocarbon conversion step.

2. The method of claim 1 wherein oxygen containing regeneration gas is provided in said regeneration zone at one or more spaced intervals to maximize the conversion of carbon monoxide to carbon dioxide.

3. The method of claim 1 wherein the exothermic conversion of carbon monoxide to carbon dioxide is promoted by relatively large spherical particles impregnated with a carbon monoxide oxidation catalyst retained in the regeneration zone.

4. The method of claim 1 wherein there are a plurality of sequentially arranged catalyst regeneration zones and oxygen containing regeneration gas is combined with the catalyst passed to each regeneration zone.

5. The method of claim 1 wherein the catalyst to be regenerated is passed as a suspension in regeneration gas upwardly through the voids in the retained mass of separate discrete particles comprising a carbon monoxide oxidation catalyst.

6. The method of claim 1 wherein the catalyst to be regenerated is caused to move downwardly through the voids in a mass of particles comprising a carbon monoxide oxidation catalyst in the presence of oxygen containing regeneration gas.

7. The method of claim 1 wherein the amount of heat absorbed by the catalyst during regeneration is greater than that provided by burning solid carbonaceous material alone.

8. The method of claim 1 wherein the catalyst passed from the regeneration zone to the hydrocarbon conversion step contains heat provided by the conversion of carbon monoxide to carbon dioxide over and above that obtainable in the absence of a carbon monoxide oxidation catalyst in the regeneration zone.

9. The method of claim 1 wherein the exothermic conversion of carbon monoxide to carbon dioxide is promoted with a carbon monoxide oxidation catalyst retained in the regeneration zone.

References Cited
UNITED STATES PATENTS

| | | | |
|---|---|---|---|
| 2,631,921 | 3/1953 | Odell | 423—659 |
| 2,885,343 | 5/1959 | Woebcke | 208—59 |
| 2,931,770 | 4/1960 | Kimberlin | 208—138 |
| 3,661,800 | 5/1972 | Pfeiffer et al. | 252—417 |
| 3,696,025 | 10/1972 | Chessmore et al. | 208—113 |
| 2,533,026 | 12/1950 | Matheson | 208—149 |

OTHER REFERENCES

Johnson and Mayland: "Carbon Burning Rates of Cracking Catalyst in Fluidized State," I&EC 47, 127–132 (1955).

DELBERT E. GANTZ, Primary Examiner

G. E. SCHMITKONS, Assistant Examiner

U.S. Cl. X.R.

208—149, 159; 252—417, 419; 423—247